US005922819A

United States Patent [19]
Wünsch et al.

[11] Patent Number: 5,922,819
[45] Date of Patent: Jul. 13, 1999

[54] PROCESS FOR PRODUCING POLYMERS OF VINYL AROMATIC COMPOUNDS USING POLYMER-CONTAINING CATALYST SYSTEMS

[75] Inventors: Josef Wünsch, Schifferstadt; Martin Lux, Dannstadt-Schauernheim; David Fischer, Gönnheim, all of Germany

[73] Assignee: BASF Aktiengesellschaft, Ludwigshafen, Germany

[21] Appl. No.: 08/894,243

[22] PCT Filed: Feb. 13, 1996

[86] PCT No.: PCT/EP96/00600

§ 371 Date: Jul. 14, 1997

§ 102(e) Date: Jul. 14, 1997

[87] PCT Pub. No.: WO96/26227

PCT Pub. Date: Aug. 29, 1996

[30] Foreign Application Priority Data

Feb. 24, 1995 [DE] Germany ......................... 195 06 556
Feb. 24, 1995 [DE] Germany ......................... 195 06 554

[51] Int. Cl.$^6$ ............................. C08F 4/642; C08F 12/04
[52] U.S. Cl. ..................... 526/160; 526/126; 526/127; 526/134; 526/170; 526/346; 526/347.2; 526/943; 502/103; 502/109; 502/152; 502/153
[58] Field of Search ..................... 526/126, 127, 526/134, 160, 170, 346, 943, 347.2, 904; 502/109, 103, 152, 153

[56] References Cited

U.S. PATENT DOCUMENTS

| | | |
|---|---|---|
| 3,933,770 | 1/1976 | Ikeda et al. . |
| 4,290,918 | 9/1981 | Bayer et al. . |
| 4,794,096 | 12/1988 | Ewen . |
| 5,610,115 | 3/1997 | Soga et al. ............ 526/160 X |
| 5,733,990 | 3/1998 | Soga et al. ............ 526/160 X |
| 5,739,226 | 4/1998 | Spitz et al. ............ 526/160 X |
| 5,770,755 | 6/1998 | Schertl et al. .......... 526/160 X |

FOREIGN PATENT DOCUMENTS

| | | |
|---|---|---|
| 206 794 | 12/1986 | European Pat. Off. . |
| 284 708 | 10/1988 | European Pat. Off. . |
| 535 582 | 4/1993 | European Pat. Off. . |
| 584 646 | 3/1994 | European Pat. Off. . |
| 826 021 | 12/1959 | United Kingdom . |
| 91/09882 | 7/1991 | WIPO . |

OTHER PUBLICATIONS

Beilstein, 5, pp. 367, 474, 485.
Maurice Morton, Amionic Polymerization, Principles and Practice, Academic Press, 1983 (copy is not available at this time).

Primary Examiner—Fred Teskin
Attorney, Agent, or Firm—Keil & Weinkauf

[57] ABSTRACT

Polymers of vinylaromatic compounds are prepared at from 0 to 150° C. in the presence of catalyst systems which comprise as active constituents A) compounds of the formula I
$$XM(Z^1)_{z_1}(Z^2)_{z_2}(Z^3)_{z_3} \quad (I)$$
where the substituents and indices have the following meanings:

X is $C_1$–$C_{10}$-alkyl, 5- to 7-membered cycloalky,
  $C_1$–$C_{10}$-alkoxy, $C_6$–$C_{15}$-aryl or a cyctopentadienyl group,
M is a metal of transition groups II to VIII of the periodic Table of the Elements,
$Z^1$ to $Z^3$
  are polymers of vinylaromatic compounds, dienes, acrylates or mixtures thereof
and
$Z^1$ to $Z^3$
  are 0, 1, 2 or 3, where $1 \leq Z_1+Z_2+Z_3 \leq 3$,
and
  B) linear or cyclic aluminoxane compound
or
compounds which form metallocenium ions and are selected from the group consisting of strong, uncharged Lewis acids, ionic compounds having a Lewis-acid cation and ionic compounds having a Brönsted acid as cation.

5 Claims, No Drawings

PROCESS FOR PRODUCING POLYMERS OF VINYLAROMATIC COMPOUNDS USING POLYMER-CONTAINING CATALYST SYSTEMS

The present invention relates to a process for preparing polymers of vinylaromatic compounds at from 0 to 150° C. in the presence of catalyst systems.

The present invention further relates to the use of the polymers obtainable in this way for producing moldings.

Owing to their property profile, polymers of vinylaromatic compounds, in particular polystyrenes, are used in many areas, for example as packaging materials or as insulating coatings for metals or plastics, specifically in electrical applications.

A process for preparing isotactic polystyrene is described in GB-A 826 021. However, isotactic polystyrene crystallizes so slowly that it can be processed only unsatisfactorily by injection molding.

Processes for preparing syndiotactic polystyrene by reaction of styrene in the presence of a metallocene complex and a cocatalyst are described, for example, in EP-A 535 582 and EP-A 584 646. Syndiotactic polystyrene has a high chemical resistance, high stiffness, good dimensional stability and good dielectric properties. However, the processes described in the documents mentioned have the disadvantage that the catalysts are not immediately active.

It is an object of the present invention to provide a new process for preparing polymers of vinylaromatic compounds which does not display the disadvantages mentioned, which is, in particular, relatively uncomplicated technically and in which the catalysts are active immediately and can be readily separated from the polymer formed and which lead to syndiotactic polymers.

We have found that this object is achieved by a process for preparing polymers of vinylaromatic compounds at from 0 to 150° C. in the presence of catalyst systems which comprise as active constituents A) compounds of the formula I
$$XM(Z^1)_{z_1}(Z^2)_{z_2}(Z^3)_{z_3} \quad (I)$$
where the substituents and indices have the following meanings:

X is $C_1$–$C_{10}$-alkyl, 5- to 7-membered cycloalkyl, $C_1$–$C_{10}$-alkoxy, $C_6$–$C_{15}$-aryl or a compound of the formula II (II)

where $R^1$ to $R^5$
are hydrogen, $C_1$–$C_{10}$-alkyl, which may bear from 1 to 5 halogen substituents, 5- to 7-membered cycloalkyl which in turn may bear $C_1$–$C_6$-alkyl groups as substituents, $C_6$–$C_{15}$-aryl or arylalkyl, where, if desired, two adjacent radicals can together form a cyclic group having from 4 to 15 carbon atoms, or halogen, $C_1$–$C_{10}$-alkoxy, $NR^6R^7$ or $Si(R^6)_3$,
and $R^6$ and $R^7$
are hydrogen, $C_1$–$C_{10}$-alkyl, $C_6$–$C_{15}$-aryl or $C_3$–$C_{10}$-cycloalkyl, M is a metal of transition groups II to VIII of the Periodic Table of the Elements, $Z^1$ to $Z^3$
are polymers of vinylaromatic compounds, dienes, acrylates or mixtures thereof
and
$z_1$ to $z_3$
are 0, 1, 2 or 3, where $1 \leq z_1+z_2+z_3 \leq 3$,
and
B) linear or cyclic aluminoxane compounds of the formula III or IV (III)

(IV)

where $R^8$ is a $C_1$–$C_4$-alkyl group and m is an integer from 5 to 30,
or
compounds which form metallocenium ions and are selected from the group consisting of strong, uncharged Lewis acids, ionic compounds having a Lewis-acid cation and ionic compounds having a Brönsted acid as cation.

Furthermore, the present invention provides for the use of the polymers obtainable in this way for producing moldings.

Particularly useful vinylaromatic compounds are compounds of the formula V (V)

where the substituents have the following meanings:
$R^9$ is hydrogen or $C_1$–$C_4$-alkyl,
$R^{10}$ to $R^{14}$ are, independently of one another, hydrogen, $C_1$–$C_{12}$-alkyl, $C_6$–$C_{18}$-aryl, halogen or two adjacent radicals together form a cyclic group having from 4 to 15 carbon atoms.

Preference is given to using vinylaromatic compounds of the formula V in which
$R^9$ is hydrogen
and
$R^{10}$ to $R^{14}$ are hydrogen, $C_1$–$C_4$-alkyl, chlorine or phenyl or two adjacent radicals together form a cyclic group having from 4 to 12 carbon atoms so that the resulting compounds of the formula V are, for example, naphthalene derivatives or anthracene derivatives.

Examples of such preferred compounds are:
styrene, p-methylstyrene, p-chlorostyrene, 2,4-dimethylstyrene, 4-vinylbiphenyl, 2-vinylnaphthalene or 9-vinylanthracene.

It is also possible to use mixtures of different vinylaromatic compounds, but preference is given to using only one vinylaromatic compound.

Particularly preferred vinylaromatic compounds are styrene and p-methylstyrene.

The preparation of vinylaromatic compounds of the formula V is known per se and described, for example, in Beilstein U.S. Pat. No. 5,367,474,485.

In the process of the present invention, the component A) comprises compounds of the formula I. Among these compounds I, preference is given to those in which X is $C_1$–$C_4$-alkyl, in particular ethyl or ethyl, $C_1$–$C_4$-alkoxy or particularly preferably a compound of the formula II

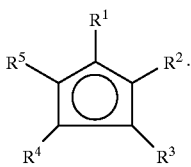

II

Among the compounds of the formula II, preference is given to those in which $R^1$ to $R^5$ is hydrogen, $C_1$–$C_4$-alkyl, in particular methyl, $C_6$–$C_{15}$-aryl, in particular phenyl or biphenyl, or two adjacent radicals together form a cyclic group having from 4 to 15 carbon atoms, in which case X is then, for example, indenyl, benzindenyl or fluorenyl, each of which may in turn be substituted by alkyl radicals.

X is particularly preferably pentamethylcyclopentadienyl.

If X is a compound of the formula II, the compounds of the formula I are semisandwich complexes.

The metal M is preferably an element of transition groups IV to VI of the Periodic Table, in particular an element of transition group IV, viz. titanium, zirconium or hafnium, preferably titanium.

$Z^1$ to $Z^3$ are polymers of vinylaromatic compounds, dienes such as butadiene or isoprene, acrylates, preferably having from 1 to 6 carbon atoms in the ester radical, in particular butyl acrylate, or mixtures thereof so that $Z^1$ to $Z^3$ are then copolymers.

$Z^1$ to $Z^3$ are preferably polymers of vinylaromatic compounds of the formula VI

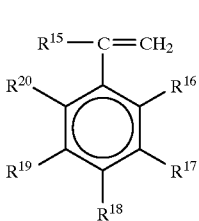

(VI)

where the substituents have the following meanings:
$R^{15}$ is hydrogen or $C_1$–$C_4$-alkyl,
$R^{16}$ to $R^{20}$ are, independently of one another, hydrogen, $C_1$–$C_{12}$-alkyl, $C_6$–$C_{18}$-aryl, halogen or two adjacent radicals together form a cyclic group having from 4 to 15 carbon atoms.

Preference is given to vinylaromatic compounds of the formula VI in which
$R^{15}$ is hydrogen
and
$R^{16}$ to $R^{20}$ are hydrogen, $C_1$–$C_4$-alkyl, chlorine or phenyl or two adjacent radicals together form a cyclic group having from 4 to 15 carbon atoms so that the resulting compounds of the formula VI are, for example, naphthalene derivatives or anthracene derivatives.

Examples of such preferred compounds are likewise styrene, p-methylstyrene, p-chlorostyrene, 2,4-dimethylstyrene, 4-vinylbiphenyl, 2-vinylnaphthalene or 9-vinylanthracene.

Particularly preferred vinylaromatic compounds of the formula VI are styrene and p-methylstyrene.

$Z^1$ to $Z^3$ are preferably polymers derived from the same compounds, particularly preferably polystyrenes. The molecular weights $M_n$ (number average) of the respective $Z^1$ to $Z^3$ are generally in the range from 500 to $10^8$ g/mol, preferably in the range from $10^3$ to $10^6$ g/mol.

It has been found to be particularly useful for $Z^1$ to $Z^3$ to be polymers derived from the same compounds, preferably polystyrenes, and the polymers prepared according to the present invention to be those in which the vinylaromatic compounds V used are the same compounds as those which lead to $Z^1$ to $Z^3$, ie. likewise styrene.

A particularly preferred compound of the formula I is that in which X is pentamethylcyclopentadienyl, M is titanium and $Z^1$ to $Z^3$ are polystyrenes.

The number $z_1$, $z_2$, $z_3$ of the respective polymers $Z^1$, $Z^2$, $Z^3$ depends essentially on the metal M. In the preferred case where M is a metal of transition group IV of the Periodic Table of the Elements, the sum $z_1+z_2+z_3$ is preferably 3.

In the compounds of the formula I, the polymers $Z^1$ to $Z^3$ are covalently bonded to the metal M.

The compounds of the formula I can be prepared by anionically polymerizing the vinylaromatic compounds, dienes, acrylates or mixtures thereof which lead to the polymers $Z^1$ to $Z^3$ and then reacting the reaction mixture with a transition metal salt of the formula VII

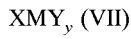 (VII)

where Y is fluorine, chlorine, bromine or iodine
and y is 1, 2 or 3.

The anionic polymerization of vinylaromatic compounds, dienes, acrylates or mixtures thereof is known per se and described in Maurice Morton, Anionic Polymerization: Principles and Practice, Academic Press, 1983. The anionic polymerization is usually carried out by addition of alkali metal compounds, for example phenyllithium, sodium methoxide, n-butyllithium or sec.-butyllithium to the monomer. A transition metal salt of the formula VII is then added to these still living, anionic polymers. Among the salts, preference is given to those in which Y is chlorine or bromine, in particular chlorine.

As regards the preferred compounds which lead to the polymers $Z^1$ to $Z^3$ and also the substituent X and the metal M in the formula VII, what has been said for the compounds of the formula I applies.

The reaction conditions for preparing the compounds of the formula I are not critical per se. The reaction temperature is generally in the range from –75 to 150° C., preferably from –10 to 100° C.

The molar amount of transition metal salt is preferably from 0.001 to 2.0 molar equivalents, based on the amount of alkali metal compounds in the anionic polymerization.

It has been found to be useful for the transition metal salt of the formula VII to be dissolved in an inert solvent. Suitable inert solvents are hydrocarbons such as pentane or hexane, benzene, toluene, xylenes, ethers such as diethyl ether or tetrahydrofuran or mixtures thereof.

The component A) can either be prepared separately and isolated or else prepared in situ immediately prior to the polymerization.

In the process of the present invention for preparing polymers of vinylaromatic compounds, the component B) used can comprise linear or cyclic aluminoxane compounds of the formula III or IV

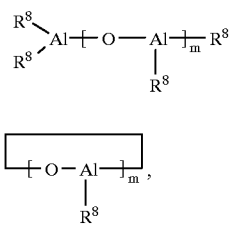

(III)

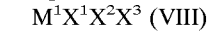

(IV)

where $R^8$ is a $C_1$–$C_4$-alkyl group, preferably a methyl or ethyl group, and m is an integer from 5 to 30, preferably from 10 to 25.

The preparation of these oligomeric aluminoxane compounds is customarily carried out by reacting a solution of trialkylaluminum with water and is described, for example, in EP-A 284 708 and U.S. Pat. No. 4,794,096.

In general, the resulting oligomeric aluminoxane compounds are in the form of mixtures of both linear and cyclic chain molecules of various lengths, so that m should be regarded as a mean value. The aluminoxane compounds can also be present in admixture with other metal alkyls, preferably aluminum alkyls.

In the process of the present invention for preparing polymers of vinylaromatic compounds, the component B) used can also comprise compounds which form metallocenium ions and are selected from the group consisting of strong, uncharged Lewis acids, ionic compounds having a Lewis-acid cation and ionic compounds having a Brönsted acid as cation.

As strong, uncharged Lewis acids, preference is given to compounds of the formula VIII $M^1 X^1 X^2 X^3$ (VIII)

where
$M^1$ is an element of main group III of the Periodic Table, in particular B, Al or Ga, preferably B,
$X^1$, $X^2$ and $X^3$
are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula VIII in which $X^1$, $X^2$ and $X^3$ are identical, preferably tris(pentafluorophenyl)borane.

Suitable ionic compounds having Lewis-acid cations are compounds of the formula IX $[(A^{a+})Q_1Q_2 \ldots Q_z]^{d+}$ (IX)

where
A is an element of main groups I to VI or transition groups I to VIII of the Periodic Table,
$Q_1$ to $Q_z$ are groups bearing a single negative charge, for example $C_1$–$C_{28}$-alkyl, $C_6$–$C_{15}$-aryl, alkylaryl, arylalkyl, haloalkyl or haloaryl each having from 6 to 20 carbon atoms in the aryl radical and from 1 to 28 carbon atoms in the alkyl radical, $C_1$–$C_{10}$-cycloalkyl, which may, if desired, bear $C_1$–$C_{10}$-alkyl groups as substituents, halogen, $C_1$–$C_{28}$-alkoxy, $C_6$–$C_{15}$-aryloxy, silyl or mercaptyl groups,
a is an integer from 1 to 6,
z is an integer from 0 to 5 and
d corresponds to the difference a–z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation.

They preferably have non-coordinating counter ions, in particular boron compounds as are also mentioned in WO 91/09882, preferably tetrakis(pentafluorophenyl)borate.

Ionic compounds having Brönsted acids as cations and preferably likewise non-coordinating counter ions are mentioned in WO 91/09882; the preferred cation is N,N-dimethylanilinium.

The polymerization according to the present invention of the vinylaromatic compounds can be carried out in solution, in bulk, in suspension or in the gas phase. Preference is given to carrying it out in solution, where solvents which can be used are, for example, aromatic hydrocarbons such as benzene, toluene, ethylbenzene or xylenes, and also ethers such as diethyl ether, dibutyl ether, ethylene glycol dimethyl ether or tetrahydrofuran, or else aliphatic hydrocarbons such as propane, n-butane, iso-butane or pentanes, and also mixtures of the various solvents, or in bulk.

The polymerization conditions are not critical per se. It is useful to employ temperatures in the range from 0 to 150° C., preferably from 10 to 100° C., pressures of from 0.1 to 100 bar, preferably from 1 to 5 bar, and polymerization times of from 0.1 to 24 hours, preferably from 0.5 to 6 hours.

The compounds of the formula I are preferably used in unsupported form, but they can also be used in supported form.

Suitable support materials are, for example, silica gels, preferably those of the formula $SiO_2 \cdot aAl_2O_3$, where a is a number from 0 to 2, preferably from 0 to 0.5; ie. essentially aluminosilicates or silicon dioxide. The supports preferably have a particle diameter in the range from 1 to 200 μm, in particular from 30 to 80 μm. Such products are commercially available, eg. as Silica Gel 332 from Grace.

Further supports are, inter alia, finely divided polyolefins, for example finely divided polypropylene or polyethylene, but also polyethylene glycol, polybutylene terephthalate, polyethylene terephthalate, polyvinyl alcohol, polystyrene, polybutadiene, polycarbonates or their copolymers.

It has been found to be advantageous to use the component A) and the oligomeric aluminoxane compound (component B)) in amounts such that the atomic ratio of aluminum from the oligomeric aluminoxane compound and the transition metal from the compounds of the formula I is in the range from 10:1 to $10^6$:1, in particular in the range from 10:1 to $10^4$:1.

Solvents used for these catalyst systems are usually aromatic hydrocarbons, preferably having from 6 to 20 carbon atoms, in particular xylenes and toluene and their mixtures.

It has also been found to be advantageous to use the component A) and the component B) (compound which forms metallocenium ions) in such amounts that the molar ratio of the component B) to the component A) is in the range from 100:1 to 0.01:1, in particular in the range from 10:1 to 0.1:1.

The components A) and B) can b e added to the reaction mixture separately from one another or can be mixed with one another prior to the polymerization reaction.

The process of the present invention is preferably carried out by initially charging the vinylaromatic compound, if desired mixed with a solvent, heating it to from 40 to 80° and adding the linear or cyclic aluminoxane compound, if desired mixed with a solvent. The compound of the formula I, if desired together with a solvent, is subsequently added. The polymerization is then preferably carried out for a time of from 45 to 90 minutes and the polymerization is stopped by addition of methanol. The polymer obtained is preferably washed with methanol and dried at from 40 to 100° C.

The process of the present invention is relatively uncomplicated technically, the catalysts employed are active immediately and can be readily separated from the polymer formed, the polymers formed are syndiotactic and are useful, in particular, for molding compositions in electrical or high-temperature applications. The molar masses of the polymer s prepared by the process of the present invention are in the range from 10,000 to 10,000,000 g/mol, preferably from 50,000 to 1,000,000 g/mol.

EXAMPLES

Example 1
Preparation of Pentamethylcyclopentadienyltris(polystyryl) titanium I1

31.25 g (0.3 mol) of unstabilized styrene were dissolved in 200 ml of n-hexane under an inert gas atmosphere in a 500 ml flask and heated to 60° C.

60 mmol of sec-butyllithium were then added to this mixture at 60° C. and polymerization was carried out for 1 hour under an inert gas atmosphere.

This mixture was subsequently added to 5.0 g (18.22 mmol) of pentamethylcyclopentadienyltitanium trichloride in 125 ml of n-hexane and cooled to 0° C. The mixture was then stirred for 12 hours at room temperature. The resulting product was separated from insoluble constituents under an inert gas atmosphere (glass frit, 4 μm) and evaporated under reduced pressure.

Example 2
Preparation of Syndiotactic Polystyrene 0.6 mol of styrene (62.5 g) was placed in a round-bottom flask made inert with nitrogen, heated to 50° C. and admixed with 3.0 ml of methylaluminoxane (MAO) from Witco (1.67 molar in toluene). The mixture was subsequently admixed with 320 mg ($16.65 \times 10^{-5}$ mol) of I1. A further 26.9 ml of the abovementioned MAO were subsequently added. The internal temperature was set to 50° C. and the mixture was allowed to polymerize for 1 hour. The polymerization was then stopped by addition of methanol. The polymer obtained was washed with methanol and dried at 50° C. under reduced pressure. The molecular weight $M_w$ (weight average) and the molecular weight distribution were determined by high-temperature GPC (gel permeation chromatography) at 135° C. using 1,2,4-trichlorobenzene as solvent. Calibration was by means of narrow-distribution polystyrene standards. The molar mass was $M_w$=42,800 with a polydispersity of $M_w/M_n$=1.81. The syndiotactic content determined by $^{13}$C-NMR was >96%.

Example 3
Preparation of Syndiotactic Polystyrene

A round-bottom flask made inert with nitrogen was charged with 0.6 mol of styrene (62.5 g) in 217 ml of ethylbenzene, the mixture was heated to 50° C. and admixed with 2.65 g (15.15 ml=$1.33 \times 10^{-2}$ mol) of triisobutylaluminum. After 2 minutes, 85.3 mg ($16.7 \times 10^{-5}$ mol) of tris (pentafluorophenyl)borane were added. The mixture was subsequently admixed with 320 mg ($16.65 \times 10^{-5}$ mol) of I1. The internal temperature was set to 50° C. and the mixture was allowed to polymerize for 5 hours. The polymerization was then stopped by addition of methanol. The polymer obtained was washed with methanol and dried at 50° C. under reduced pressure. The molecular weight $M_w$ (weight average) and the molecular weight distribution were determined by high-temperature GPC (gel permeation chromatography) at 135° C. using 1,2,4-trichlorobenzene as solvent. Calibration was by means of narrow-distribution polystyrene standards. The molar mass was $M_w$=5200 with a polydispersity of $M_w/M_n$=1.99. The syndiotactic content determined by $^{13}$C-NMR was >96%.

We claim:
1. A process for preparing polymers of vinylaromatic compounds at from 0 to 150° C. in the presence of catalyst systems which comprise as active constituents
   A) compounds of the formula I
      $$XM(Z^1)z_1(Z^2)z_2(Z^3)z_3 \quad (I)$$
   where the substituents and indices have the following meanings:
   X is $C_1$–$C_{10}$-alkyl, 5- to 7-membered cycloalkyl, $C_{1-C10}$-alkoxy, $C_6$–$C_{15}$-aryl or a substituent the formula II

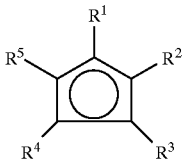

(II)

where $R^1$ to $R^5$
   are hydrogen, $C_1$–$C_{10}$-alkyl, which may bear from 1 to 5 halogen substituents, 5- to 7-membered cycloalkyl which in turn may bear $C_1$–$C_6$-alkyl groups as substituents, $C_6$–$C_{15}$-aryl or arylalkyl, where two adjacent radicals can together form a cyclic group having from 4 to 15 carbon atoms, or halogen, $C_1$–$C_{10}$-alkoxy, $NR^6R^7$ or $Si(R^6)_3$,
where $R^6$ and $R^7$
   are hydrogen, $C_1$–$C_{10}$-alkyl, $C_6$–$C_{15}$-aryl or $C_3$–$C_{10}$-cycloalkyl,
M is a metal of transition groups II to VIII of the Periodic Table of the Elements,
$Z^1$ to $Z^3$
   are polymers of vinylaromatic compounds, dienes, acrylates or mixtures thereof
and
$z_1$ to $z_3$
   are 0, 1, 2 or 3, where $1 \leq z_1+z_2+z_3 \leq 3$,
and
   B) linear or cyclic aluminoxane compounds of the formula III or IV

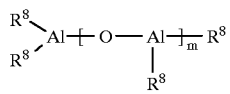

(III)

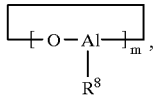

(IV)

where $R^8$ is a $C_1$–$C_4$-alkyl group and m is an integer from 5 to 30,
or
compounds which form metallocenium ions and are selected from the group consisting of strong, uncharged Lewis acids, ionic compounds having a Lewis-acid cation and ionic compounds having a Brönsted acid as cation.

2. A process as claimed in claim 1, wherein the vinylaromatic compounds used are compounds of the formula V

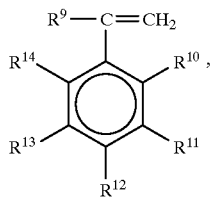

(V)

where the substituents have the following meanings:
$R^9$ is hydrogen or $C_1$–$C_4$-alkyl,
$R^{10}$ to $R^{14}$ are, independently of one another, hydrogen, $C_1$–$C_{12}$-alkyl, $C_6$–$C_{18}$-aryl, halogen or two adjacent radicals may together form a cyclic group having from 4 to 15 carbon atoms.

3. A process as claimed in claim 1, wherein the vinylaromatic compounds of the formula V

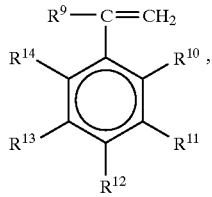

(V)

which are used are ones in which
$R^9$ is hydrogen
and
$R^{10}$ to $R^{14}$ are hydrogen, $C_1$–$C_4$-alkyl, chlorine or phenyl or two adjacent radicals may together form a cyclic group having from 4 to 12 carbon atoms.

4. A process as claimed in claim 1, wherein the component A) used comprises compounds of the formula I in which x is a substituent of the formula II,
M is a metal of transition groups IV to VI
and
$Z^1$ to $Z^3$ are polymers of vinylaromatic compounds of the formula VI

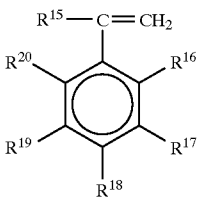

VI where the substituents have the following meanings:
$R^{15}$ is hydrogen or $C_1$–$C_4$-alkyl,
$R^{16}$ to $R^{20}$ are, independently of one another, hydrogen, $C_1$–$C_{12}$-alkyl, $C_6$–$C_{18}$-aryl, halogen or two adjacent radicals may together form a cyclic group having from 4 to 15 carbon atoms.

5. A process as claimed in claim 1, wherein the component B) used comprises strong, uncharged Lewis acids of the formula $M^1X^1X^2X^3$ (VIII)

where
$M^1$ is an element of main group III of the Periodic Table, $X^1$, $X^2$ and $X^3$
are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine.

\* \* \* \* \*